Feb. 25, 1958   G. L. CLAYBOURN ET AL   2,824,939
COOLING MEANS FOR METAL-CLAD SWITCHGEAR
Filed March 17, 1955
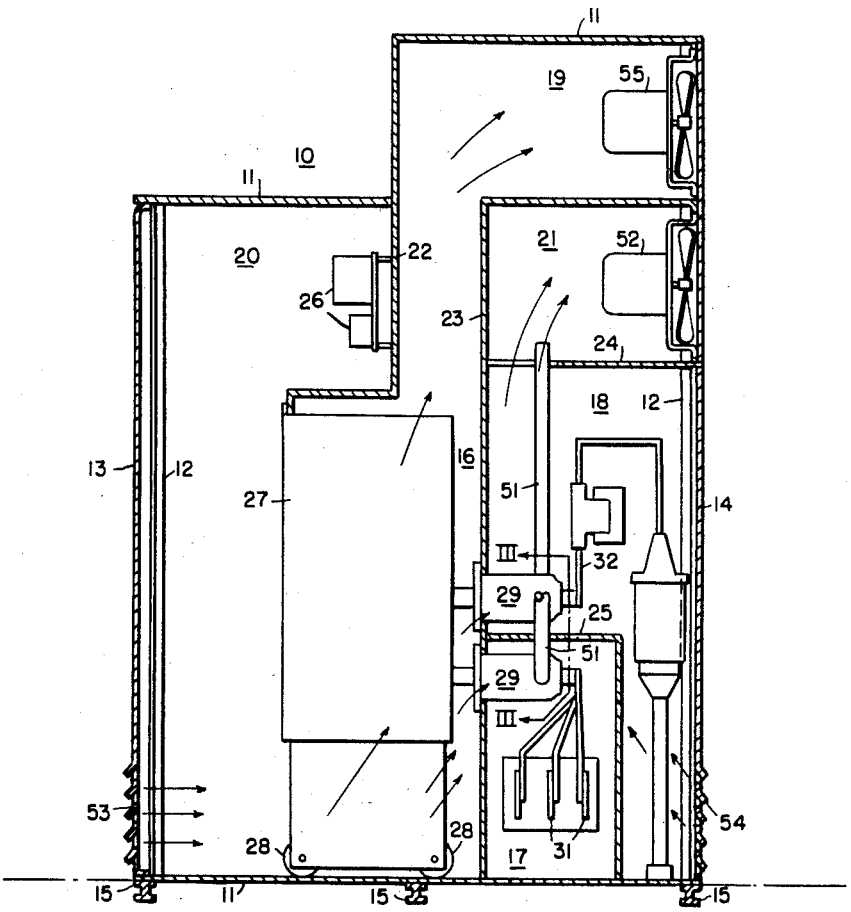
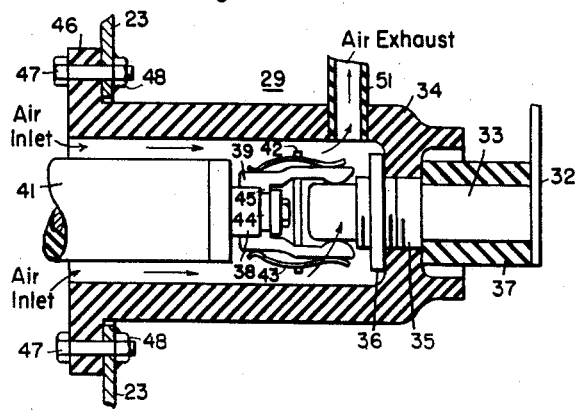
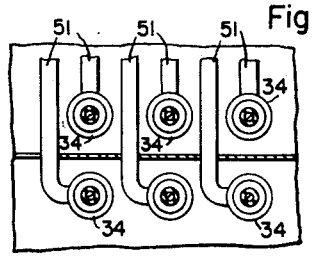
INVENTORS
Glen L. Claybourn
and Charles P. West.
BY
Ralph H Swingle
ATTORNEY

United States Patent Office 2,824,939
Patented Feb. 25, 1958

---

2,824,939

COOLING MEANS FOR METAL-CLAD SWITCHGEAR

Glen L. Claybourn and Charles P. West, Pittsburgh, Pa., assignors to Westinghouse Electric Corporation, a corporation of Pennsylvania Application March 17, 1955, Serial No. 494,995

6 Claims. (Cl. 200—166)

Our invention relates, generally, to metal-clad switchgear and, more particularly, to forced ventilation of the primary disconnecting contacts for the removable breaker units in metal-clad switchgear.

The primary disconnecting contacts for draw-out circuit breaker units are usually disposed inside of insulators when the switchgear is utilized in relatively high voltage systems. Enclosing the disconnecting contacts in insulators prevents air from circulating freely about the contact members and reduces the dissipation of heat from the contacts.

An object of our invention, generally stated, is to provide a ventilating system for enclosed switchgear apparatus which shall be simple and efficient in operation and which may be economically manufactured and installed.

A more specific object of our invention is to provide for ventilating enclosed primary disconnecting contacts in metal-clad switchgear.

A further object of our invention is to ventilate the primary disconnecting contacts for each phase of a multiphase metal-clad switchgear structure.

Other objects of our invention will be explained fully hereinafter or will be apparent to those skilled in the art.

In accordance with one embodiment of our invention, each primary disconnecting contact for a removable circuit breaker unit is disposed inside of a generally cylindrical insulating sleeve or bushing which is open at one end and closed at the other end by a contact stud mounted in the bushing. The inner end of the stud is engaged by contact fingers disposed around the stud. The contact fingers are mounted on a stud carried by the circuit breaker unit. A vent tube is connected to the bushing to exhaust air which is drawn into the open end of the bushing and flows around the contact members.

For a better understanding of the nature and objects of the invention, reference may be had to the following detailed description, taken in conjunction with the accompanying drawing, in which:

Figure 1 is a view, partly in section and partly in side elevation, of a metal-clad switchgear structure embodying the principal features of the invention;

Fig. 2 is an enlarged view, in section, of one of the primary disconnecting contacts utilized in the switchgear structure, and Fig. 3 is a view, partly in elevation and partly in section, taken along the line III—III in Fig. 1.

Referring to the drawing, and particularly to Fig. 1, the structure shown therein comprises a metal-clad switchgear cubicle or housing 10 which may be constructed by securing sheet metal members 11 to angle frame members 12 in a manner well-known in the art. A hinged door 13 is provided at the front of the housing and a removable panel 14 is provided at the rear of the housing to permit access to the inside of the housing. The switchgear structure may rest upon beams 15 embedded in a suitable foundation.

The housing 10 may be divided into a plurality of compartments, such as a circuit breaker compartment 16, a bus compartment 17, a current transformer, and outgoing cable compartment 18, and exhaust compartments 19 and 21 which will be described more fully hereinafter. The various compartments are separated by partition members 22, 23, 24 and 25 as shown. The enclosure is completed by side sheets (not shown). The usual instruments and relays 26 may be mounted in a control compartment 20 located above and in front of the circuit breaker compartment 16.

A circuit breaker unit 27 is disposed in the breaker compartment 16 and may be moved horizontally into and out of the housing on wheels 28. In accordance with the usual practice, the breaker unit is provided with primary disconnecting contacts 29 which connect the breaker unit to bus bars 31 and outgoing conductors 32. The primary disconnecting contacts 29 may be of the type described in Patent 2,376,818, issued May 22, 1945, to M. J. Rubel and assigned to the Westinghouse Electric Corporation.

As shown most clearly in Fig. 2, each primary disconnecting contact comprises a stationary portion and a movable portion. The stationary portion comprises a round stud 33 which is mounted in a generally cylindrical insulating bushing 34. The stud 33 has an enlarged portion 35 which is disposed in an opening in the rear end of the bushing 34. A nut 36 threaded on the enlarged portion 35 may be drawn against the inside of the end of the bushing 34 and a spacing sleeve 37 is disposed on the stud 33 between the outside of the bushing 34 and the conductor 32 which is secured to the outer end of the stud 33. Thus, the spacing sleeve 37 may be drawn against the outside of the bushing 34 by tightening the nut 36 against the inside of the bushing to retain the stud 33 in the bushing.

The movable portion of the disconnecting contact comprises a round stud 38 and a plurality of contact fingers 39 disposed around the periphery of the stud 38. The stud 38 is connected to a terminal of the circuit breaker 27 and is carried by the circuit breaker unit. An insulating sleeve 41 surrounds a portion of the stud 38.

In order to retain the contact fingers 39 in their correct angular position around the periphery of the stud 38, a spacing ring 42 is provided. The ring 42 has openings therein for the fingers 39 and a leaf-type spring 43 disposed between each finger and the ring 42 to maintain contact pressure between the fingers 39 and the studs 33 and 38. A groove 44 is provided near the end of the stud 38 for receiving an inwardly extending projection 45 on each contact finger to retain the fingers on the stud when the movable portion of the contact assembly is disengaged from the stationary stud 33. The open end of the bushing 34 has a flange 46 thereon which may be attached to the barrier 23 of the housing by bolts 47 which may be threaded into nuts 48 welded to the barrier 23.

Since the contact members of each disconnecting contact assembly are enclosed in an insulating bushing they may have a tendency to overheat, particularly when required to carry heavy or overload currents. In order to reduce the tempeature of the primary disconnecting contacts we have provided a system for ventilating each primary disconnecting contact assembly. As shown, a ventilating tube 51, which is composed of insulating material, is connected to an opening in the side of each bushing 34 near the closed or contact end of the bushing. The tubes 51 extend upwardly from the primary disconnecting contacts and exhaust into the exhaust compartment 21. As shown in Fig. 3, the tubes for the lower row of bushings are curved at their lower ends to offset these tubes from the upper bushings. A motor driven fan 52 is mounted in the compartment 21 to exhaust air or other cooling fluids from the compartment.

As indicated by the arrows in Figs. 1 and 2, air is drawn into the circuit breaker compartment 16 through louvers 53 in the door 13, then into the open end of each bushing 34 and out through the tube 51 into the exhaust compartment 21, from which it is exhausted by the fan 52. In this manner air is caused to circulate around the contact members of each primary disconnecting contact, thereby reducing the temperature of the contact assembly.

As shown in Fig. 1, air may also be drawn into the compartment 18 through louvers 54 in the rear panel 14. This air circulates around the exposed ends of the primary disconnecting contacts and the conductors connected thereto. This circulation of air by the fan 52 helps to reduce the temperature of the conductors that are connected to the primary disconnecting contacts, thereby reducing the temperature of the disconnecting contacts.

As also shown in Fig. 1, another fan 55 is provided in the compartment 19 for exhausting any gases resulting from the operation of the circuit breaker to interrupt an arc. Thus, these gases are prevented from coming in contact with the air circulated through the primary disconnecting contacts. Furthermore, air is drawn around the circuit breaker unit by the fan 55, thereby reducing the temperature of the circuit breaker unit and hence the temperature of the primary disconnecting contacts which are connected to the terminals of the circuit breaker unit. In this manner the temperature of the entire switchgear structure is materially reduced, thereby enabling the structure to carry overload currents without becoming overheated, or the continuous rating of the unit may be increased without increasing the operating temperature of the unit.

If the switchgear structure is to be installed in dirty or corrosive atmospheres the cooling fluid for the structure may be supplied by a pressurized system such as described in Patent 2,501,345, issued March 21, 1950, to J. B. MacNeill and B. I. Hayford. As described in the foregoing patent an inert gas, such as nitrogen or air which has been cleaned and made substantially non-corrosive and non-explosive, is introduced into the housing by a pressure system, thereby maintaining the pressure inside of the housing above atmospheric pressure.

The pressurized air or gas may be caused to circulate around the primary disconnecting contacts in the manner herein described, and exhausted through the exhaust tubes, thereby cooling the primary disconnecting contacts. Instead of exhausting the air or gas to atmosphere it may be recirculated through the pressure system, thereby requiring only a small amount of makeup fluid to maintain operation of the system.

From the foregoing description it is apparent that we have provided a system for ventilating the current conducting parts of a switchgear structure and particularly the primary disconnecting contacts of a switchgear structure having a removable circuit breaker unit installed therein. The system is simple and efficient in operation and relatively inexpensive. Thus, the system may be installed and operated economically.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

We claim as our invention:

1. In a switchgear structure, in combination, a housing having a plurality of compartments therein, a circuit breaker unit removably disposed in one of said compartments, power conductors disposed in two other separate compartments, a plurality of primary disconnecting contacts for the circuit breaker, half of said contacts being connected to the conductors in one compartment and half being connected to the conductors in the other compartment, an individual insulating bushing surrounding each disconnecting contact, each bushing having an open end accessible from the breaker compartment, a separate ventilating tube for each bushing, said tubes exhausting into still another compartment, means for causing a fluid to flow around the breaker unit and through said bushings by way of said open ends and said tubes to reduce the temperature of the disconnecting contacts, and means for separating exhaust gases of the circuit breaker from the fluid which flows through the bushings.

2. In a switchgear structure, in combination, a housing, a circuit breaker removably disposed in the housing, a plurality of primary disconnecting contacts for the circuit breaker, an individual insulating bushing surrounding each disconnecting contact, a separate vertically disposed ventilating tube for each bushing, said tubes exhausting into a common compartment of the housing, said compartment being above the disconnecting contacts, means for causing a fluid to flow through said bushings and said tubes to reduce the temperature of the disconnecting contacts, and means for preventing exhaust gases of the circuit breaker from flowing through the bushings.

3. In a switchgear structure, in combination, a housing having a plurality of compartments therein, a circuit breaker unit removably disposed in one of the compartments, a plurality of primary disconnecting contacts for the circuit breaker, half of said contacts being disposed in another compartment and half in still another compartment, a generally cylindrical bushing surrounding each disconnecting contact, each bushing being open at one end and closed at the other end by a portion of the disconnecting contact, a ventilating opening in each bushing, all of said openings being connected to a compartment other than the breaker compartment and the contact compartments, means for causing a fluid to flow from the breaker compartment into the open ends of the bushings and out through said openings to reduce the temperature of the disconnecting contacts, and means for exhausting gases from the circuit breaker to prevent them from flowing through said bushings.

4. In a switchgear structure, in combination, a housing, a circuit breaker unit removably disposed in the housing, a plurality of primary disconnecting contacts for the circuit breaker, a generally cylindrical bushing surrounding each disconnecting contact, each bushing being open at the end adjacent the breaker unit and closed at the other end by a portion of the disconnecting contact, a vertically disposed ventilating tube connected to the side of each bushing near the closed end, means for causing a fluid to flow around the breaker unit and through the bushings by way of the open ends and the tubes to lower the temperature of the disconnecting contacts, and means for separating exhaust gases of the circuit breaker from the fluid which flows through the bushings and the tubes.

5. In a switchgear structure, in combination, a housing having a plurality of compartments therein, a circuit breaker unit removably disposed in one of said compartments, a plurality of primary disconnecting contacts for the circuit breaker, half of said contacts being disposed in another compartment and half in still another compartment, an individual insulating bushing surrounding each disconnecting contact, each bushing having an open end accessible from the breaker compartment, a separate ventilating tube for each bushing, said tubes exhausting into an exhaust compartment other than the breaker compartment, means for causing a fluid to flow through the breaker compartment into said bushings and out through said tubes into said exhaust compartment, and means for exhausting gases from the circuit breaker to prevent them from flowing through the bushings and the tubes.

6. In a switchgear structure, in combination, a housing having a plurality of compartments therein, a circuit breaker unit removably disposed in one of said compartments, a plurality of primary disconnecting contacts for the circuit breaker, half of said contacts being disposed in another compartment and half in still another compartment, an individual insulating bushing surrounding each disconnecting contact, each bushing having an open end accessible from the breaker compartment, a separate ventilating tube for each bushing, said tubes exhausting into an exhaust compartment other than the breaker compartment, means for causing a fluid to flow through the breaker compartment into said bushings and out through said tubes into said exhaust compartment, a separate exhaust compartment for the circuit breaker other than the exhaust compartment for said tubes, and means for exhausting gases from the breaker exhaust compartment to keep the gases from the breaker separated from the fluid which flows through the bushings and the tubes.

References Cited in the file of this patent
UNITED STATES PATENTS

| | | |
|---|---|---|
| 1,612,318 | Riley | Dec. 28, 1926 |
| 1,706,810 | Paul | Mar. 26, 1929 |
| 2,033,743 | Shoemaker | Mar. 10, 1936 |
| 2,376,818 | Rubel | May 22, 1945 |
| 2,501,345 | MacNeill et al. | Mar. 21, 1950 |
| 2,502,876 | Mullen | Apr. 4, 1950 |
| 2,619,521 | Cuttino | Nov. 25, 1952 |

FOREIGN PATENTS

| | | |
|---|---|---|
| 306,343 | Italy | Mar. 10, 1933 |